(12) United States Patent
Guo et al.

(10) Patent No.: US 8,490,243 B2
(45) Date of Patent: Jul. 23, 2013

(54) WHEEL ASSEMBLY FOR AN INFANT CARRIER APPARATUS

(75) Inventors: Zhen-Wen Guo, Central Hong Kong (HK); Er Xue Wang, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 13/247,033

(22) Filed: Sep. 28, 2011

(65) Prior Publication Data

US 2012/0086193 A1   Apr. 12, 2012

(30) Foreign Application Priority Data

Oct. 8, 2010 (CN) .......................... 2010 1 0512513
Apr. 14, 2011 (CN) .......................... 2011 1 0098594
Jul. 29, 2011 (CN) ...................... 2011 2 0273248 U

(51) Int. Cl.
  *B60B 33/00*   (2006.01)
(52) U.S. Cl.
  USPC ................................ 16/35 R; 16/35 D; 16/44
(58) Field of Classification Search
  USPC ................. 16/44, 35 D, 35 R; 188/1.12, 281, 188/282.1, 282.5, 282.6; 280/250.1, 86.1, 280/483, 485; 180/21; 267/153, 195, 196, 267/257, 258, 292, 293
  See application file for complete search history.

(56) References Cited

U.S. PATENT DOCUMENTS

| | | | | |
|---|---|---|---|---|
| 2,738,542 A | * | 3/1956 | Clark, Jr. .......................... | 16/44 |
| 2,915,776 A | * | 12/1959 | Hanson et al. ..................... | 16/44 |
| 4,524,482 A | * | 6/1985 | Mueller ............................. | 16/44 |
| 4,962,916 A | * | 10/1990 | Palinkas ........................ | 267/153 |
| 5,351,364 A | * | 10/1994 | Zun ................................ | 16/35 R |
| 5,400,469 A | * | 3/1995 | Simonsen ......................... | 16/44 |
| 6,203,054 B1 | * | 3/2001 | Matsumoto .................. | 280/647 |
| 6,212,733 B1 | * | 4/2001 | Yeh .................................. | 16/35 R |
| 6,478,316 B1 | * | 11/2002 | Wagner .......................... | 280/37 |
| 7,093,319 B2 | * | 8/2006 | Lemeur et al. .................... | 16/44 |
| 2004/0111830 A1 | * | 6/2004 | Cooper et al. .................... | 16/44 |
| 2007/0257457 A1 | * | 11/2007 | Dotsey et al. ............... | 280/47.38 |

FOREIGN PATENT DOCUMENTS

CN        2915623 Y     6/2007

* cited by examiner

*Primary Examiner* — Chuck Y. Mah
(74) *Attorney, Agent, or Firm* — David I. Roche; Baker & McKenzie LLP

(57) ABSTRACT

A wheel assembly for an infant carrier apparatus can include a shock absorber, and at least a wheel pivotally coupled with the shock absorber. Examples of the infant carrier apparatus can include an infant stroller apparatus. In some embodiments, the shock absorber can be directly connected with a support frame of the infant carrier apparatus. In other embodiments, the wheel assembly can include a mount base through which the shock absorber is connected with the support frame.

18 Claims, 14 Drawing Sheets

WHEEL ASSEMBLY FOR AN INFANT CARRIER APPARATUS

CROSS-REFERENCE TO RELATED APPLICATIONS

This application claims priority to Chinese Patent Application No. 201010512513.2 filed on Oct. 8, 2010, Chinese Patent Application No. 201110098594.0 filed on Apr. 14, 2011, and Chinese Patent Application No. 201120273248.7 filed on Jul. 29, 2011.

BACKGROUND OF THE INVENTION

1. Field of the Invention

The present invention relates to a wheel assembly for an infant carrier apparatus.

2. Description of the Related Art

An infant stroller apparatus usually includes multiple wheel assemblies that are provided with elastic elements, e.g., springs. The elastic element can provide cushioning action when the wheel is rolling on a ground surface, such that the child can rest comfortably in the stroller apparatus. However, the current designs usually install the elastic element between a mount base of the wheel assembly and a support leg of the stroller, which may not be convenient to assemble.

Therefore, there is a need for an improved wheel assembly that is simple in structure and address at least the foregoing issues.

SUMMARY

The present application describes a wheel assembly for an infant carrier apparatus. In some embodiments, the wheel assembly can include a shock absorber, and at least a wheel pivotally coupled with the shock absorber. In some embodiments, the infant carrier apparatus is an infant stroller apparatus.

At least one advantage of the wheel assembly is the ability to provide a shock absorber designed with a mount structure that can directly couple with the wheel shaft. Accordingly, the amount of component parts can be reduced.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
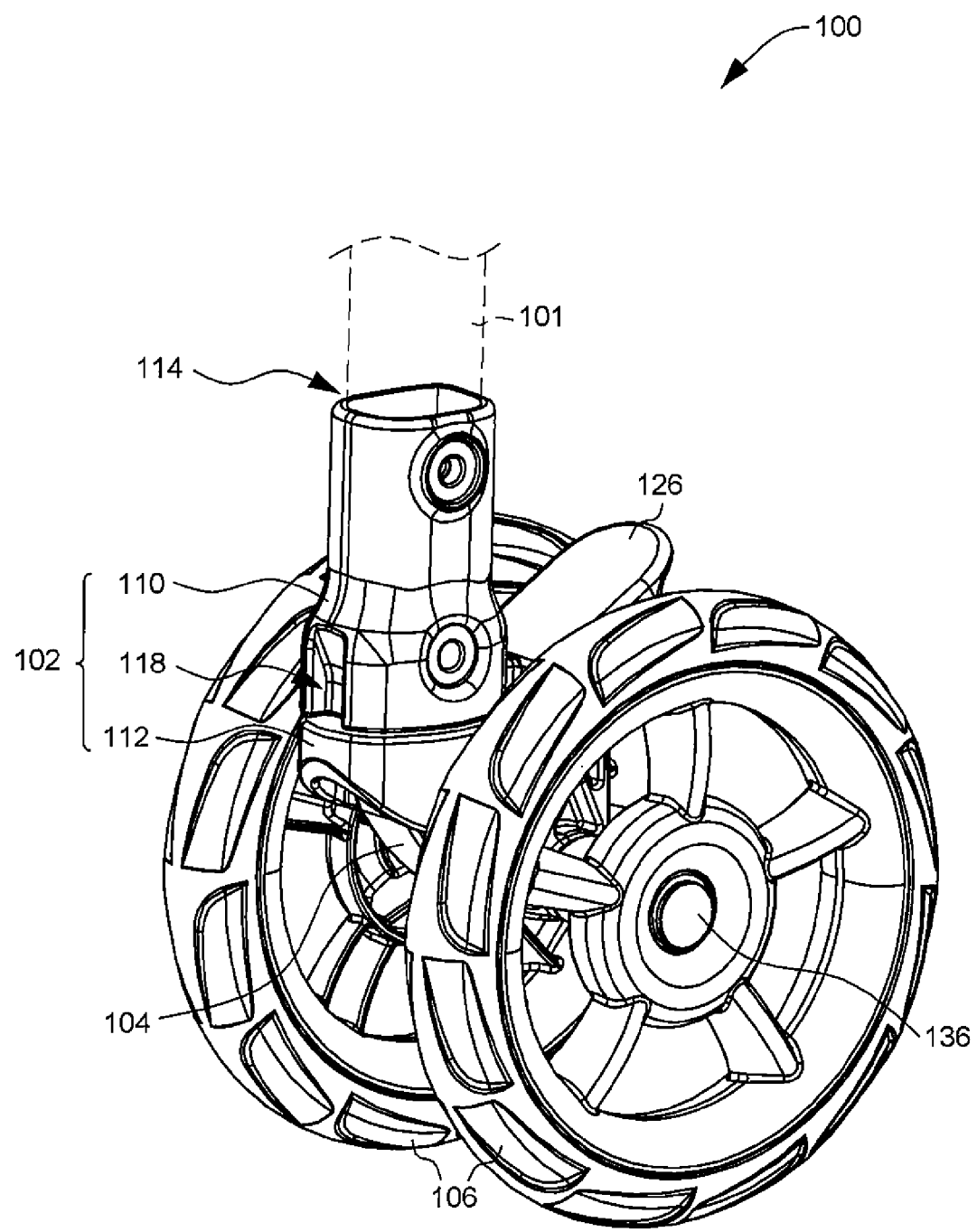
FIG. 1 is a schematic perspective view illustrating an embodiment of a wheel assembly for an infant carrier apparatus.

FIGS. 1-4 are respectively schematic perspective, exploded, partially enlarged, and cross-sectional views illustrating the construction of a wheel assembly 100 for an infant carrier apparatus. The wheel assembly 100 can include a mount base 102, a shock absorber 104 and at least a wheel 106 (two wheels 106 are exemplary illustrated in this embodiment). The mount base 102 can be affixed with a frame portion 101 (shown with dotted lines). The shock absorber 104 can be directly connected with the mount base 102 and the wheel 106 to provide cushioning when the infant carrier apparatus is in movement. In this example, the wheel assembly 100 can be formed as a front wheel assembly.

Figure 2:
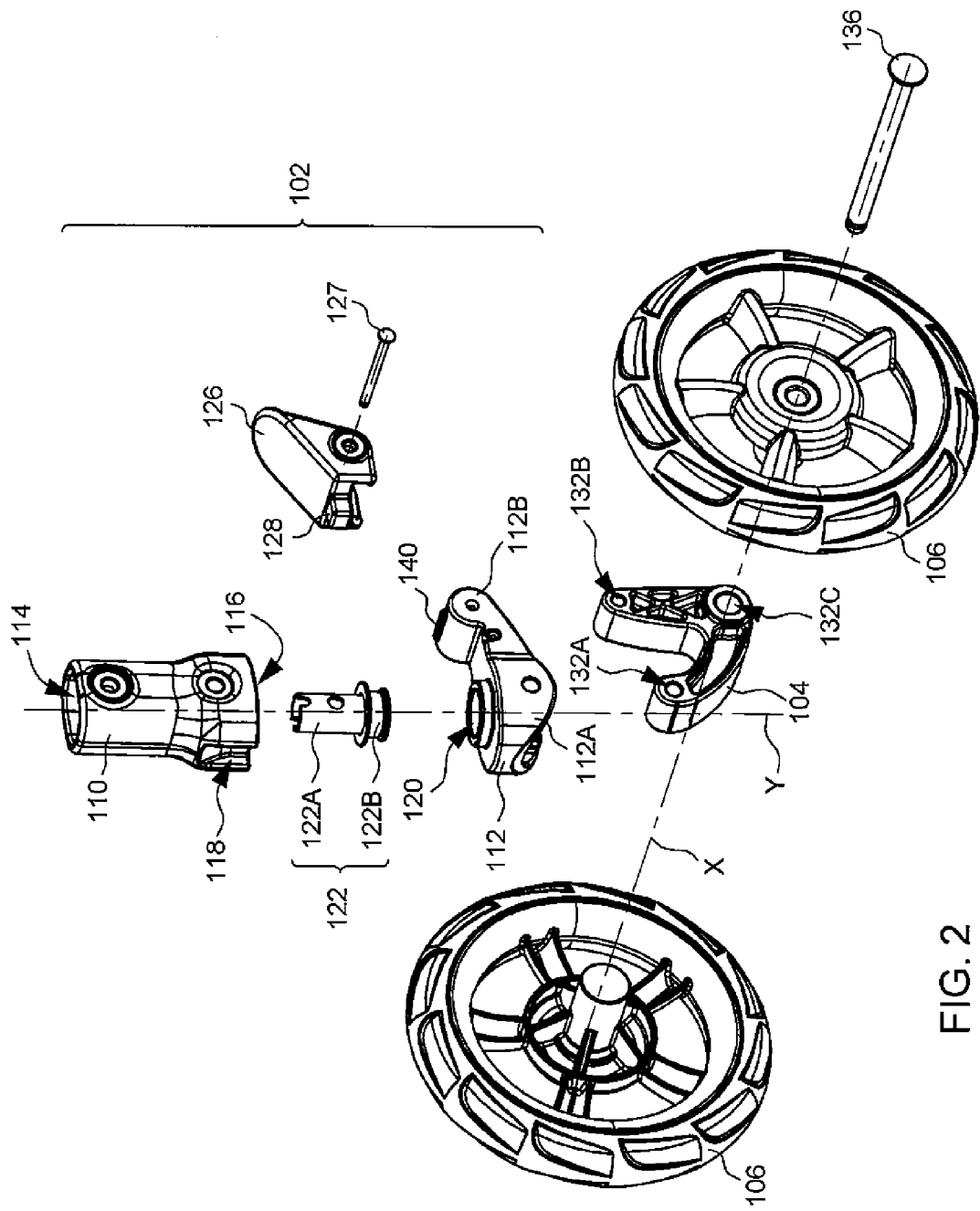
FIG. 2 is an exploded view of the wheel assembly shown in FIG. 1.

Referring to FIG. 1, the mount base 102 can include a joint element 110, and a rotary element 112 pivotally connected with the joint element 110. The joint element 110 can be a tubular element having a first end provided with an opening 114 through which the frame portion 101 can be inserted and securely fastened. As shown in FIG. 2, a second end of the joint element 110 opposite to the first end can define a central opening 116, and have an outer surface provided with at least a slot 118 (two slots 118 are exemplary provided at two opposite sides of the second end in the illustrated embodiment).

Figure 3:
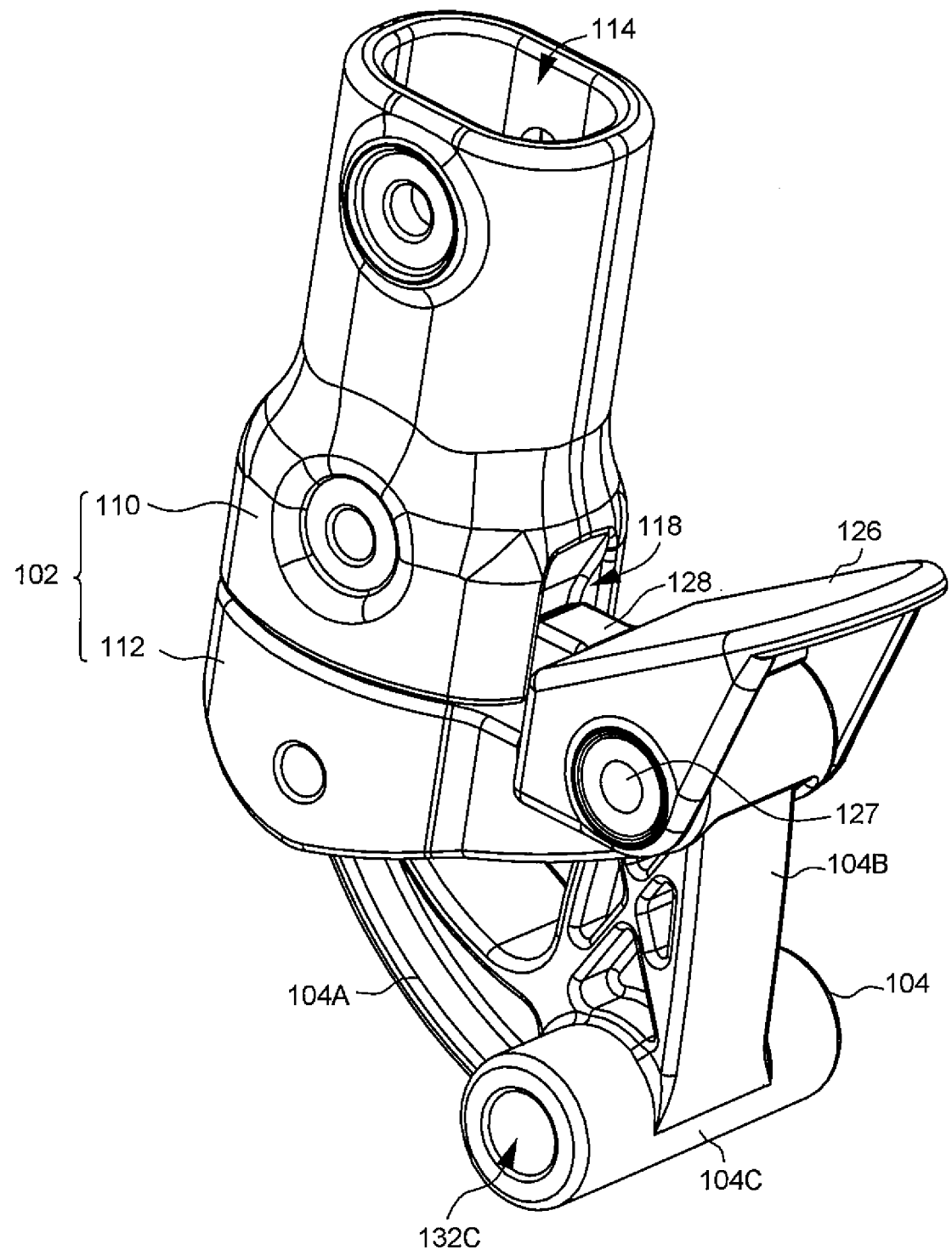
FIG. 3 is a partially enlarged view of the wheel assembly shown in FIG. 1.

Referring to FIGS. 2 and 3, the rotary element 112 can have a shape that extends generally perpendicular to the joint element 110. The rotary element 112 can include a first end portion 112A located below the joint element 110, and a second end portion 112B joined with the first end portion 112A and located outward the outer surface of the joint element 110. As shown in FIG. 2, the first end portion 112A can include an opening 120 corresponding to the position of the central opening 116, and can be pivotally connected with the joint element 110 via a bearing 122.

Figure 4:
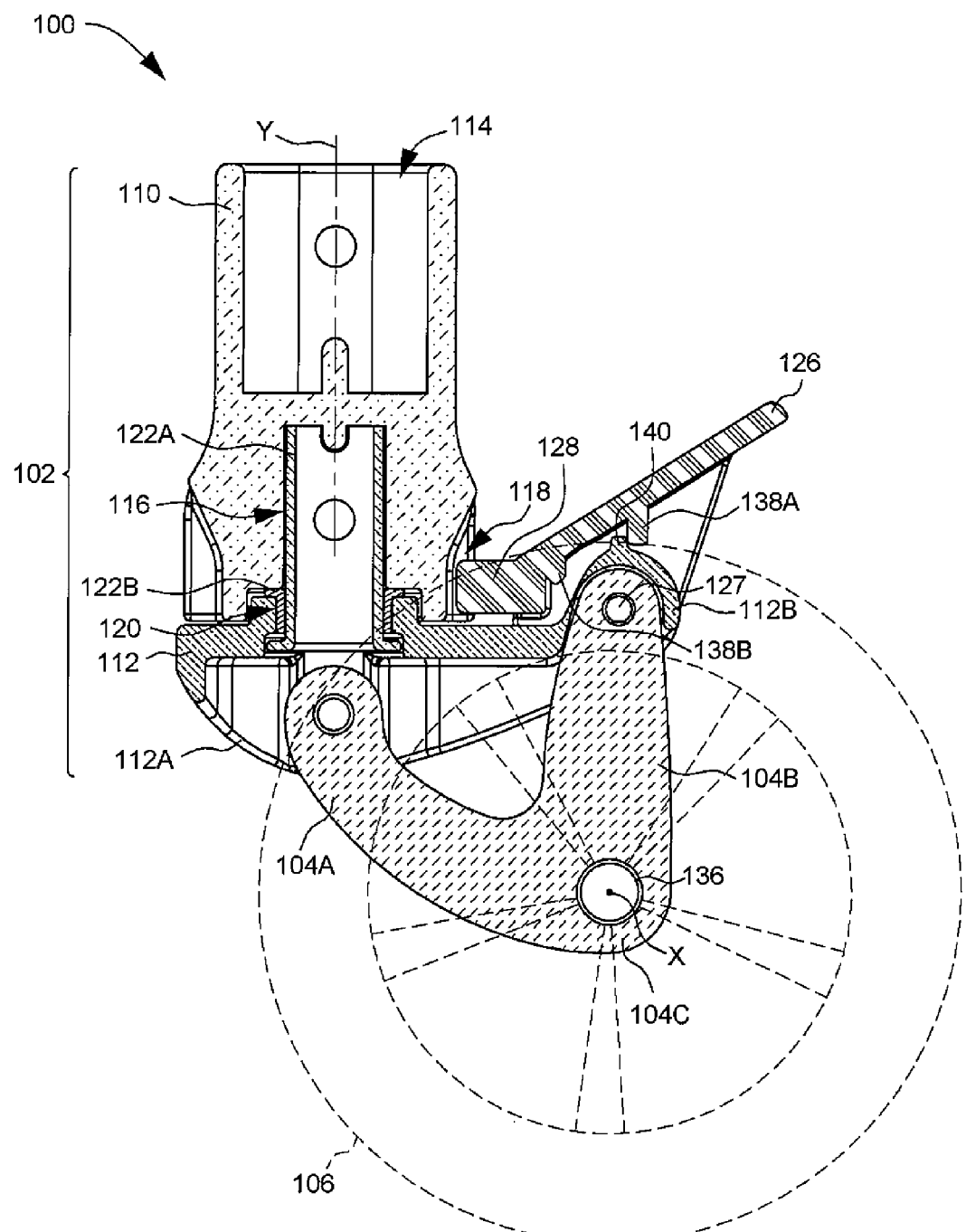
FIG. 4 is a cross-sectional view of the wheel assembly shown in FIG. 1.

Referring to FIGS. 2 and 4, according to one embodiment, the bearing 122 can exemplary include a shaft portion 122A and a bearing ring 122B. The shaft portion 122A can pass through the central opening 116 and securely affix with the joint element 110. The bearing ring 122B can be passed through the opening 120 to securely mount with the rotary element 112, and be mounted so as to pivot around the shaft portion 122A. A pivotal connection can be thereby achieved between the joint element 110 and the rotary element 112, allowing the rotary element 112 to rotate about a pivot axis Y relative to the joint element 110.

Referring again to FIG. 2, a second end portion 112B of the rotary element 112 can be provided with a latch element 126. The latch element 126 can be pivotally connected with second end portion 112B via a pivot link 127, whereby the latch element 126 can rotate relative to the rotary element 112 and the joint element 110. As shown in FIG. 4, an end of the latch element 126 corresponding to the slot 118 can have a protrusion 128 that can selectively engage with the slot 118 to lock the rotary element 112 in position relative to the joint element 110. Accordingly, the orientation of the wheel 106 can be locked.

Figure 5:
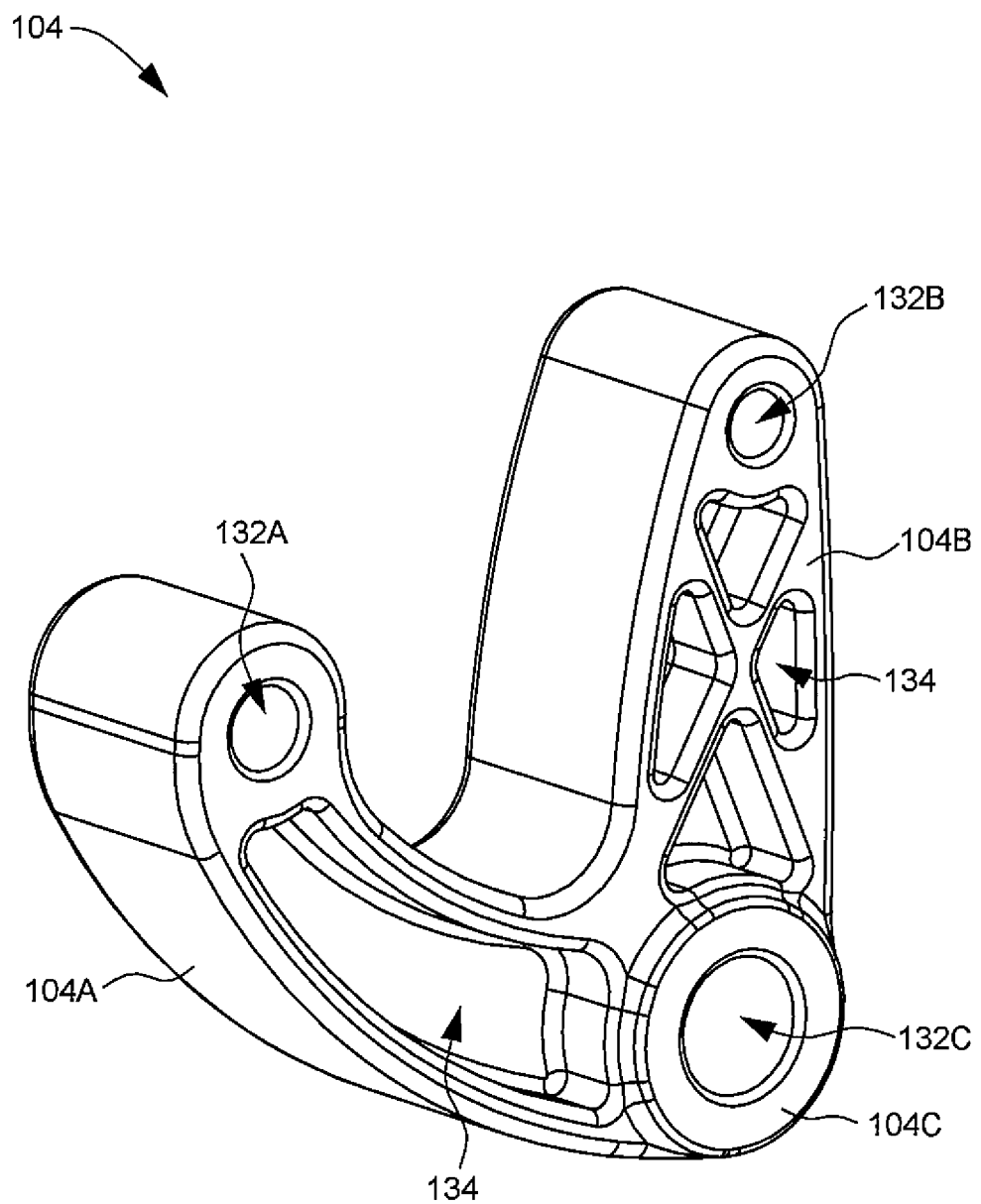
FIG. 5 is a perspective view of an shock absorber provided in the wheel assembly shown in FIG. 1.

FIG. 5 is a perspective view of the shock absorber 104. The shock absorber 104 can be formed in a single body from a solid material that can have elastic characteristics adapted to absorb shocks and vibration. Examples of suitable materials for the shock absorber 104 can include, without limitation, thermoplastic polyester elastomer (TPEE), such as the TPEE sold under the trademark Hytrel® by E.I. du Pont de Nemours and Company. The shock absorber 104 can have a generally V-shape or U-shape including first and second arms 104A and 104B, and a link portion 104C joined between the first and second arms 104A and 104B. The first and second arms 104A and 104B can have distal ends respectively provided with mount holes 132A and 132B, and the link portion 104C can have a mount hole 132C. To increase the elasticity of the shock absorber 104, the first and second arms 104A and 104B can respectively include a plurality of cavities 134. In the embodiment illustrated in FIG. 5, the cavities 134 are not limited to any shapes or arrangements. For example, the cavities 134 can be arranged according to a honeycomb distribution in the shock absorber 104. The cavities 134 can be formed as openings, through holes, recesses, blind holes, and like structures that can be adapted to increase the resilience of the shock absorber 104.

As shown in FIGS. 1-5, fastener elements (not shown) can be respectively engaged through the mount holes 132A and 132B to assemble the distal ends of the first and second arms 104A and 104B with the first and second end portions 112A and 112B of the rotary element 112. In one embodiment, rivets can be used to achieve pivotal connections, such that the first and second arms 104A and 104B can respectively have some degree of rotation relative to the first end portion 112A and the second end portion 112B. Moreover, a wheel shaft 136 can respectively pass through the wheel 106 and the mount hole 132C of the shock absorber 104, so that the wheel 106 can be directly coupled with the shock absorber 104 and pivot about a rotation axis X relative to the shock absorber 104. During operation, the shock absorber 104 can elastically deform to absorb vibrations as the wheel 106 is rolling on an uneven surface. With the aforementioned construction, the amount of component parts required to mount the wheel assembly 100 can be decreased, which can reduce the manufacture cost. In addition, as the shock absorber 104 is connected with the mount base 102 via two ends, the cushioning action can be more stable.

Figure 6:
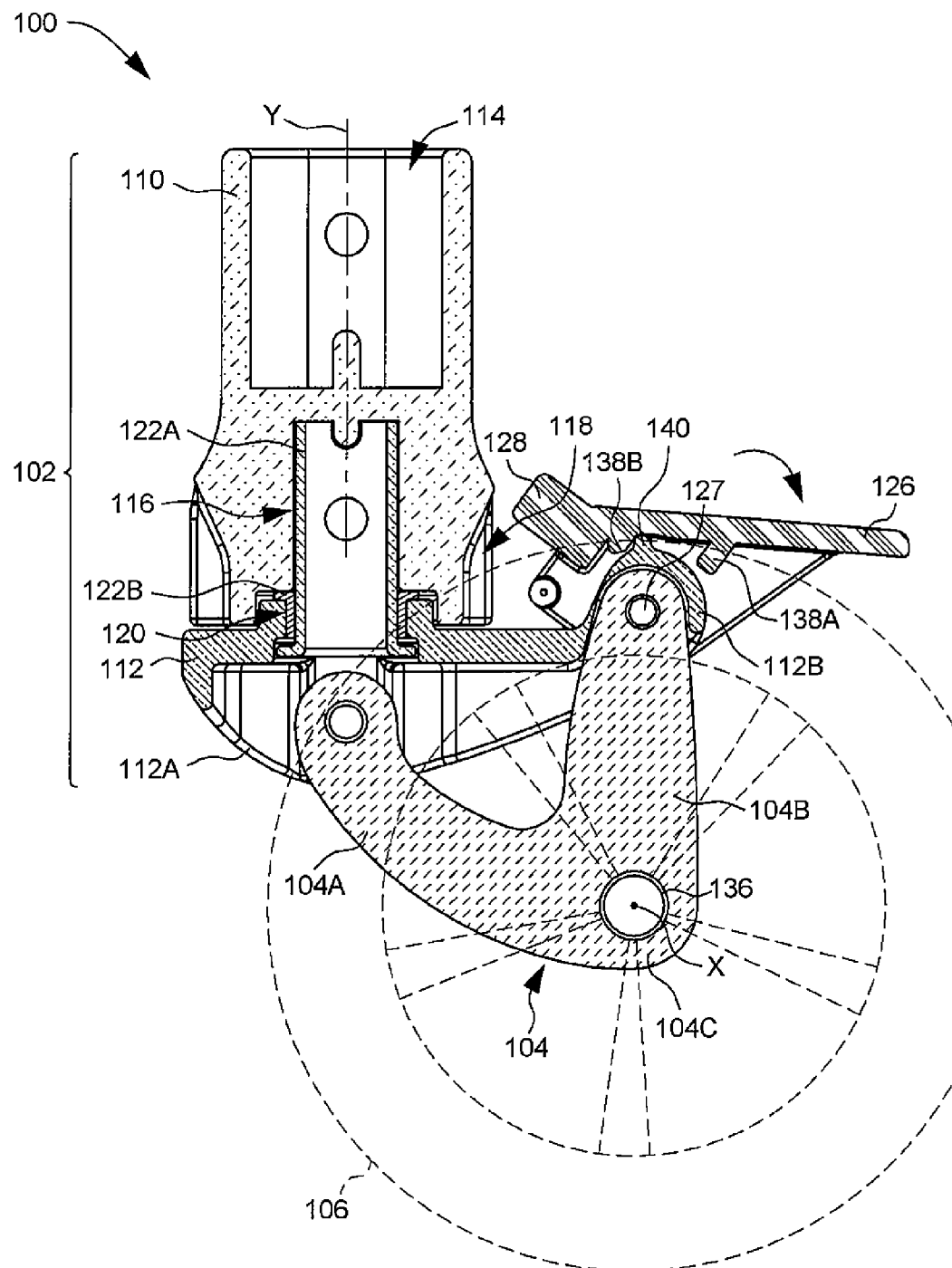
FIG. 6 is a schematic view illustrating the operation of a latch element provided in the wheel assembly shown in FIG. 1.

FIG. 6 is a schematic view illustrating an operation of the latch element 126. When the protrusion 128 of the latch element 126 is engaged with the slot 118 (as shown in FIG. 4), the rotary element 112 can be blocked in position and cannot rotate relative to the joint element 110. Accordingly, the orientation of the rotary element 112, the shock absorber 104 and the wheel 106 can be locked relative to the joint element 110. As a result, the orientation of the wheel 106 can be locked, and the infant carrier apparatus can be displaced linearly. When the infant carrier apparatus needs to turn, the latch element 126 can be depressed to cause the protrusion 128 to disengage from the slot 118. As a result, the latch element 126 can be switched from the locked state shown in FIG. 4 to the unlocked state shown in FIG. 6, allowing the rotary element 112, the shock absorber 104 and the wheel 106 to rotate in unison about the pivot axis Y relative to the joint element 110.

Referring to FIGS. 4 and 6, the latch element 126 can also be provided with two limiting ribs 138A and 138B, and the rotary element 112 can include a stop rib 140. As the latch element 126 is rotating relative to the rotary element 112 toward the locked position, the stop rib 140 can abut against the limiting rib 138A to hold the latch element 126. As the latch element 126 is rotating relative to the rotary element 112 toward the unlocked position, the stop rib 140 can abut against the limiting rib 138B to limit the range of rotation of the latch element 126 relative to the rotary element 112.

Figure 7:
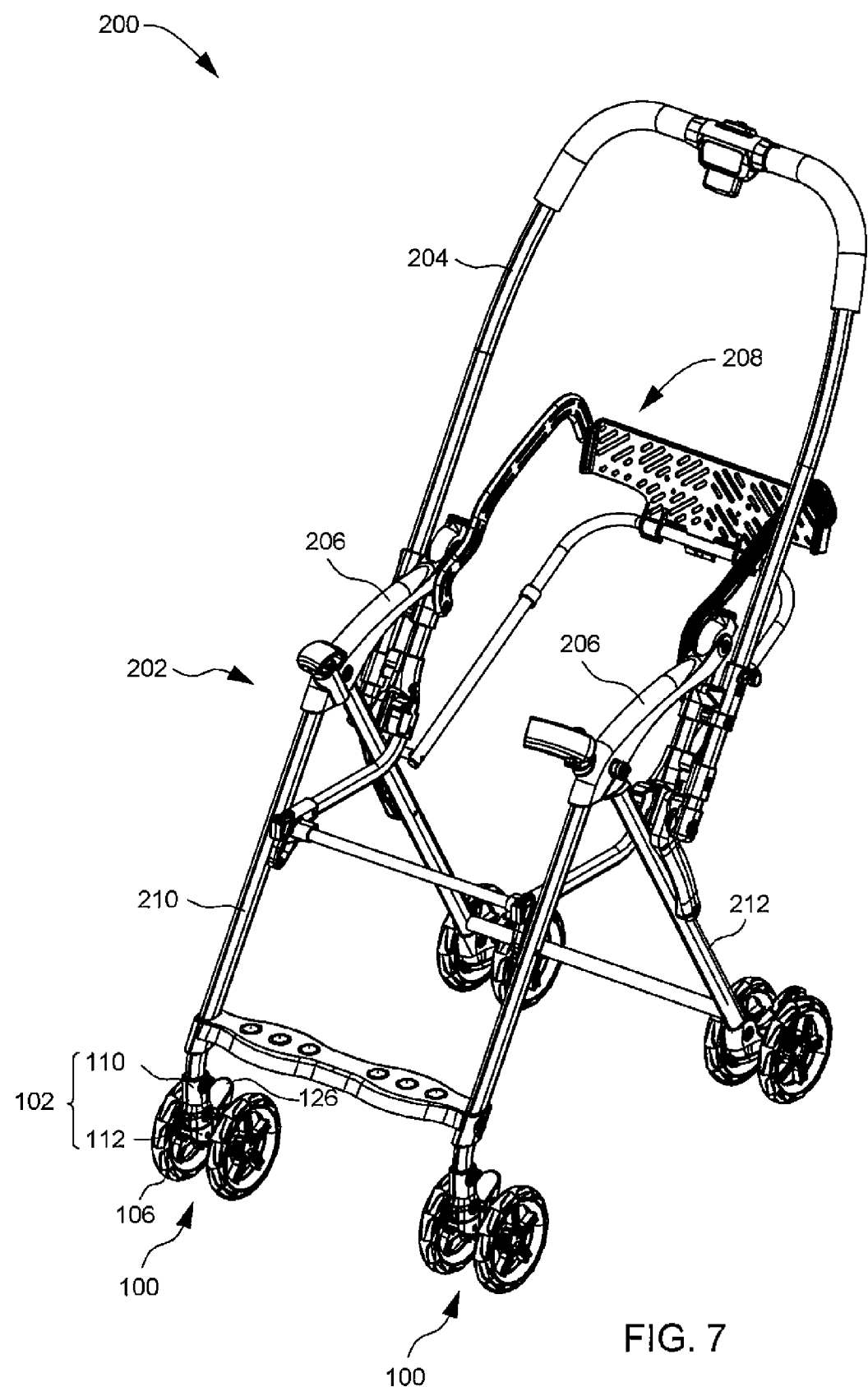
FIG. 7 is a schematic view illustrating a stroller embodiment of an infant carrier apparatus provided with the wheel assembly shown in FIG. 1.

The wheel assembly 100 can be used in different types of infant carrier apparatuses, such as infant strollers, play yards, etc. FIG. 7 is a schematic view illustrating an infant carrier apparatus 200 provided with the wheel assembly 100. The infant carrier apparatus 200 is an infant stroller apparatus including a support frame 202, a handle 204, armrests 206 and a backrest frame 208. The support frame 202 can include a front leg frame 210 and a rear leg frame 212. One or more lower end of the front leg frame 210 can be mounted with the wheel assembly 100. In other words, the lower end of front leg frame 210 can be inserted into the opening 114 of the joint element 110 to fixedly attach with the mount base 102. According to the needs, the latch element 126 can be operable to switch to the locked state or unlocked state for controllably allowing a turning or linear displacement of the infant carrier apparatus 200.

It is worth noting that the assembly of the shock absorber 104 and the wheel 106 are not limited to the aforementioned mount base 102. In alternate embodiments, the shock absorber 104 and wheel 106 can also be assembled with a mount base having no latch element 126 and no rotary element 112. Because the shock absorber 104 and the wheel 106 are directly connected with each other, the amount of component parts can be decreased, which can reduce the manufacture cost. Moreover, according to the use condition, the wheel assembly 100 can be designed with variant constructions to adjust its elasticity so that the infant carrier apparatus 200 can provide comfortable seating during displacement.

Figure 8:
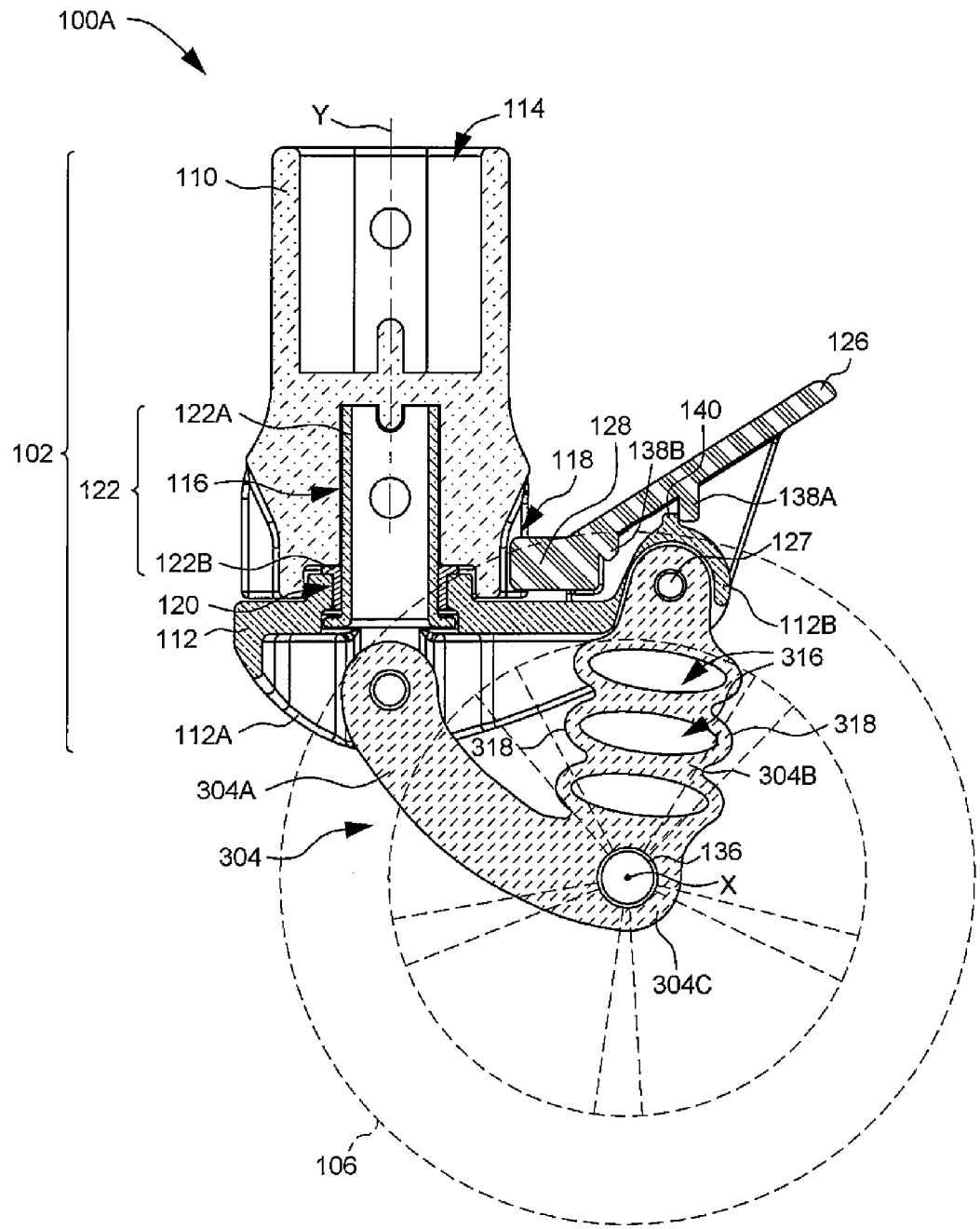
FIG. 8 is a schematic view illustrating another embodiment of a wheel assembly.
Figure 9:
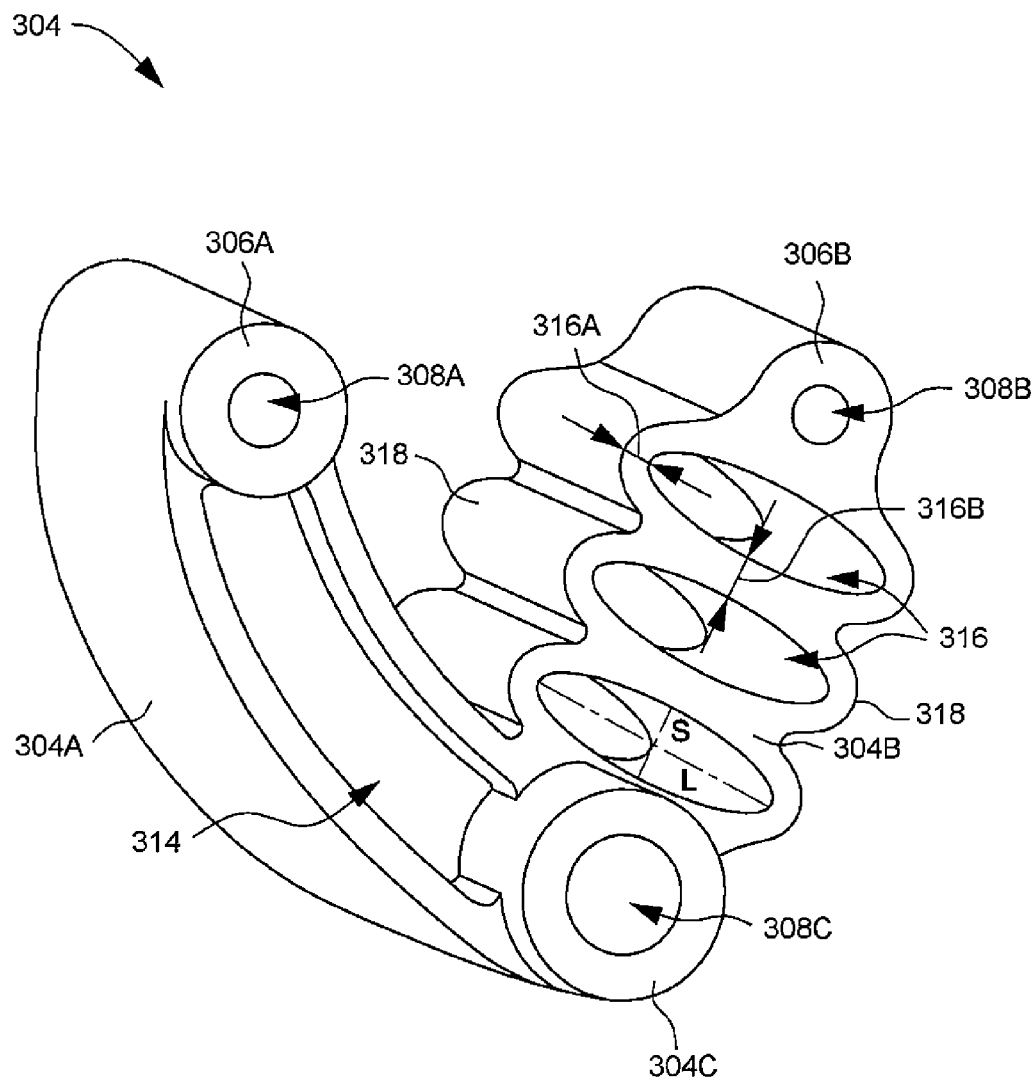
FIG. 9 is a schematic view illustrating an embodiment of a shock absorber provided in the wheel assembly shown in FIG. 8.

FIGS. 8 and 9 are schematic views respectively illustrating another embodiment of a wheel assembly 100A, and a shock absorber 304 provided in the wheel assembly 100A. The wheel assembly 100A can include a mount base 102, a shock absorber 304 and a wheel 106. The mount base 102 can be similar in construction to the mount base described previously including a tubular joint element 110, and a rotary element 112 pivotally connected with the joint element 110. A frame portion can be inserted and fixedly attached through the opening 114 of the joint element 110. The first end portion 112A of the rotary element 112 can be pivotally connected through the central opening 116 of the joint element 110 via the bearing 122. The bearing 122 can include a shaft portion 122A and a bearing ring 122B. The shaft portion 122A can be tightly mounted through the central opening 116 of the joint element 110. The bearing ring 122B can be securely mounted through the opening 120 of the rotary element 112 and assembled so as to pivot around the shaft portion 122A. A pivotal connection can be thereby achieved between the joint element 110 and the rotary element 112, allowing the rotary element 112 to rotate about a pivot axis Y relative to the joint element 110.

The second end portion 112B of the rotary element 112 can be provided with a latch element 126. The latch element 126 can be pivotally connected with second end portion 112B via the pivot link 127, whereby the latch element 126 can rotate relative to the rotary element 112 and the joint element 110. An end of the latch element 126 corresponding to the slot 118 can have a protrusion 128 that can selectively engage with the slot 118 to lock the rotary element 112 in position relative to the joint element 110. Accordingly, rotation of the wheel 106 can be blocked. For limiting the range of displacement of the latch element 126, the latch element 126 can also be provided with two limiting ribs 138A and 138B, and the rotary element 112 can include a stop rib 140 located between the two limiting ribs 138A and 138B. As the latch element 126 is rotating relative to the rotary element 112 toward the locked position, the stop rib 140 can abut against the limiting rib 138A to hold the latch element 126. As the latch element 126 is rotating relative to the rotary element 112 toward the unlocked position, the stop rib 140 can abut against the limiting rib 138B to limit the range of rotation of the latch element 126 relative to the rotary element 112.

As shown in FIGS. 8 and 9, the shock absorber 304 can be formed integrally in a single body from a solid material that can have elastic characteristics to provide cushioning, e.g., thermoplastic polyester elastomer (TPEE), such as the TPEE sold under the trademark Hytrel® by E.I. du Pont de Nemours and Company. The shock absorber 304 can have a generally V-shape or U-shape including first and second arms 304A and 304B, and a link portion 304C connected between the first and second arms 304A and 304B. The first and second arms 304A and 304B can have distal ends that respectively form connection ends 306A and 306B provided with mount holes 308A and 308B to assemble with the first and second end portions 112A and 112B of the rotary element 112. Moreover, the wheel shaft 136 can respectively pass through the wheel 106 and a mount hole 308C provided in the link portion 304C of the shock absorber 304. Accordingly, the wheel 106 can be coupled with the shock absorber 304 and pivot about a rotation axis X relative to the shock absorber 304. As shown in FIG. 8, the rotation axis X of the wheel 106 can be disposed offset from the pivot axis Y at a location between the two connection points of the first and second arms 304A and 304B with the rotary element 112.

To provide adequate cushion action, the first arm 304A of the shock absorber 304 can have a slightly curved shape provided with a cavity 314. The second arm 304B can extend linearly, and also include a plurality of spaced-apart cavities 316 of elongated shapes that are aligned axially (three cavities 316 are provided in the illustrated embodiment). The cavity 314 can exemplary be a blind opening having an elongated shape. The cavities 316 can be through holes opened at two opposite side surfaces of the second arm 304B. In some embodiments, each of the cavities 316 can also be formed with a geometrically symmetric shape having a long axis, for example an oval shape having a long axis L and a short axis S (as shown), a lozenge shape, a rectangular shape and the like. In other embodiments, each of the cavities 316 can also be formed with a circular shape. Other constructions can be applicable so that deformation of the second arm 304B can mainly occur along its direction of extension and be concentrated in the portion between the connection end 306B and the link portion 304C.

In some embodiments, the portion of the second arm 304B provided with the cavities 316 can have two opposite side surfaces that form wave-shaped surfaces 318 that conform with the shapes of the cavities 316. Further, a material thickness 316A that separates each cavity 316 from an outer side surface of the second arm 304B (i.e., the wave-shaped surface 318) can be smaller than a material thickness 316B between two adjacent cavities 316. One or more of these features can facilitate deformation of the second arm 304B.

By disposing the cavities 316 along the length of the second arm 304B, the second arm 304B can deform lengthwise in a uniform manner, which can prevent buckling breaks due to locally excessive deformation.

With the examples of construction described previously, the second arm 304B can have a greater range of deformation to provide proper cushion capabilities. As a result, when the wheel assembly 100A is loaded, the second arm 304B can be subjected to deformation to provide cushion action in a vertical direction.

Figure 10:
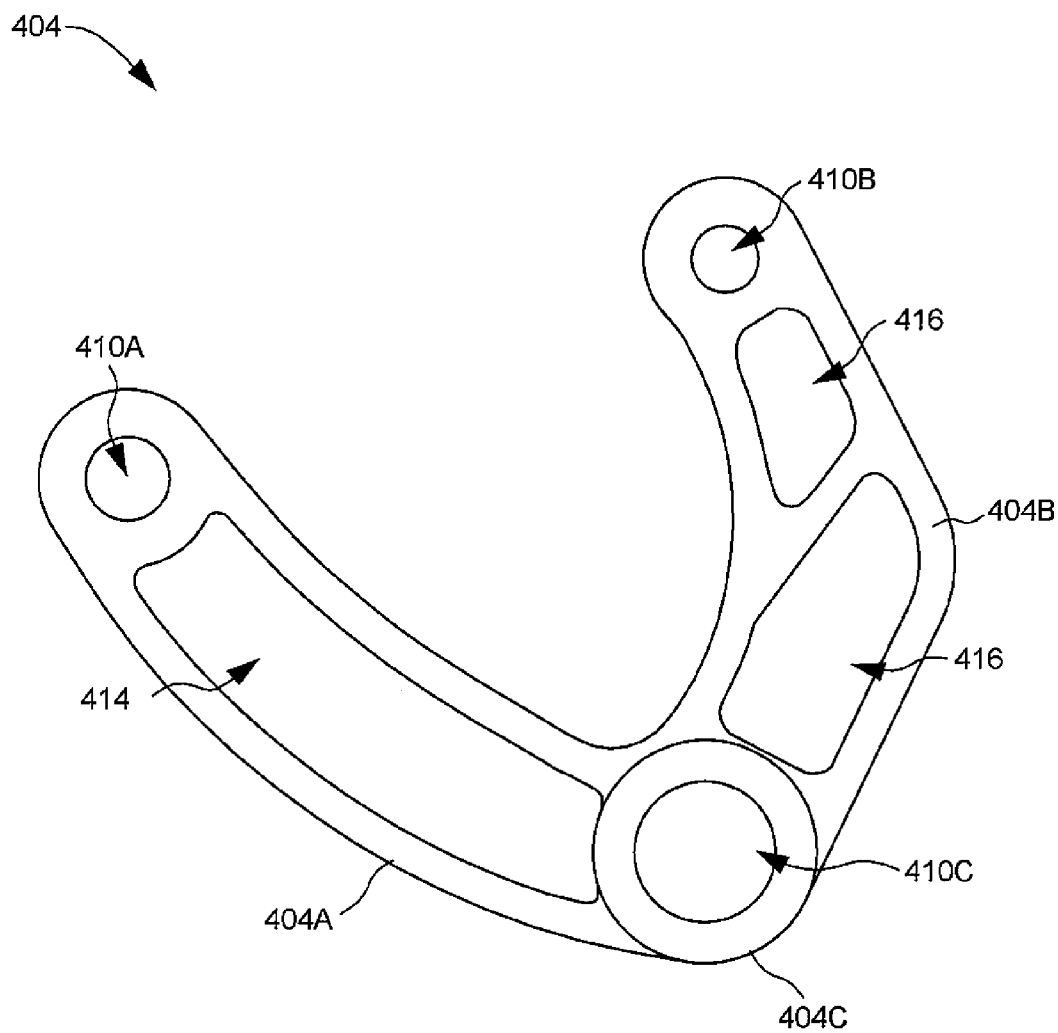
FIG. 10 is a schematic view illustrating a variant construction of a shock absorber.

FIG. 10 is a schematic view illustrating a variant construction of a shock absorber 404. The shock absorber 404 can have a generally V-shape or U-shape including first and second arms 404A and 404B, and a link portion 404C connected between the first and second arms 404A and 404B. The first and second arms 404A and 404B can have distal ends that are respectively provided with mount holes 410A and 410B for assembly with the rotary element 112 (as shown in FIG. 8). The link portion 404C can include a mount hole 410C for pivotal assembly with the wheel 106 (like previously described).

In one embodiment, the first arm 404A of the shock absorber 404 can have a slightly curved shape, and include a blind slot 414 of an elongated shape. The second arm 404B of the shock absorber 404 can be formed with two portions bent relative to each other and provided with spaced-apart cavities 416. Accordingly, the second arm 404B of the shock absorber 404 can be subjected to a greater range of elastic deformation to provide cushioning effects.

It is worth noting that the construction of the shock absorber is not limited to the aforementioned examples. For example, while the previous embodiments are provided with two or three cavities, any amounts of cavities may be possible. One variant embodiment hence may have a shock absorber in which the second arm is provided with a single cavity. Moreover, alternate embodiments may also provide a wheel assembly in which the shock absorber may be directly mounted with the support frame of the infant carrier apparatus without the need of a mount base. An example of a shock absorber directly mounted with the frame is described hereafter with reference to FIGS. 11-14.

Figure 11:
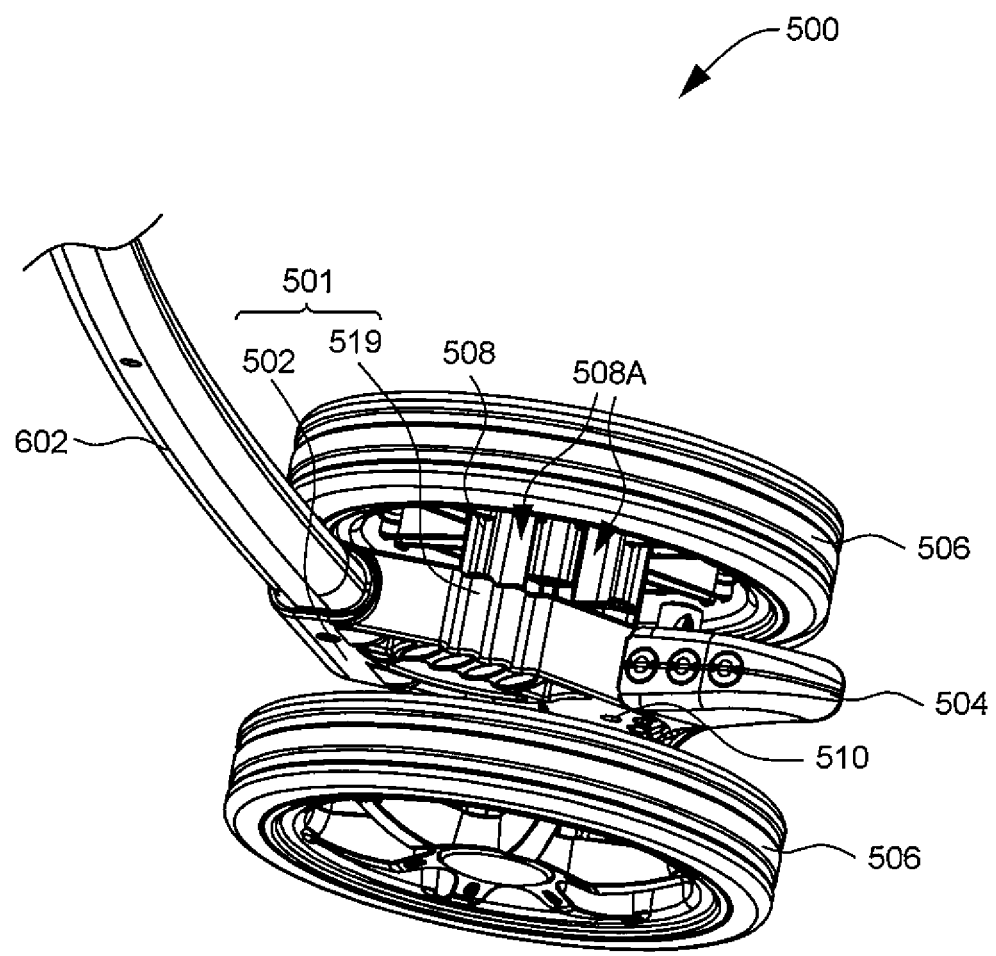
FIG. 11 is a schematic view illustrating a wheel assembly according to another embodiment.

FIG. 11 is a schematic view illustrating a wheel assembly 500 according to another embodiment. The wheel assembly 500 can include a shock absorber 501, a brake element 504 and at least a wheel (two wheels 506 are shown in the illustrated embodiment). In this example, the wheel assembly 500 can be provided as a rear wheel assembly. The shock absorber 501 can have a front end portion directly affixed with a frame portion 602 (better shown in FIG. 14). The frame portion 602 can be a tube segment, for example. The shock absorber 501 can be pivotally connected with the wheels 506 at two lateral sides. Each of the wheels 506 can have an inner side provided with a hub 508 mounted between the tire of the wheel 506 and the shock absorber 501. The hub 508 can have an outer circular surface provided with a plurality of recesses 508A disposed in different radial directions.

Figure 12:
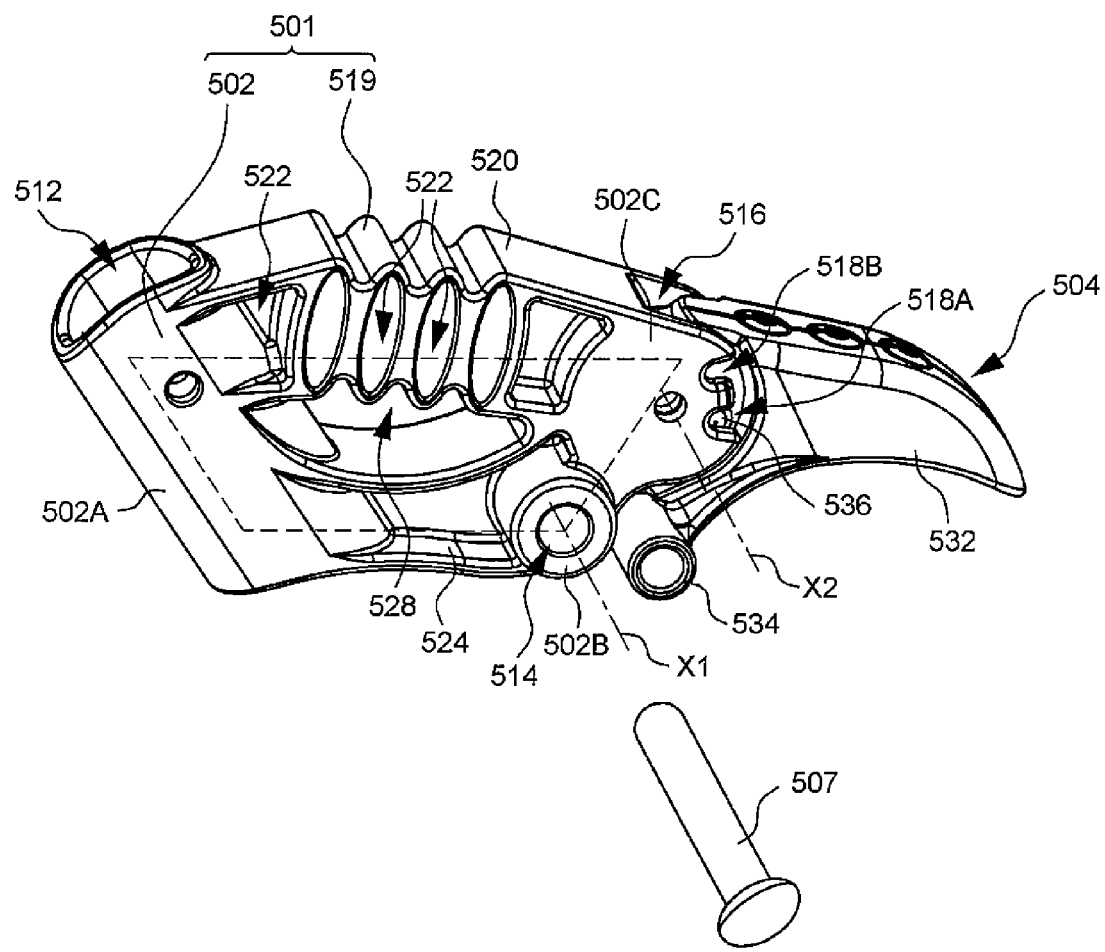
FIG. 12 is a schematic view illustrating the assembly of a shock absorber and a brake element in the wheel assembly shown in FIG. 11.

FIG. 12 is a schematic view illustrating the assembly of the shock absorber 501 and the brake element 504. The shock absorber 501 and the wheel 506 can be pivotally connected together via a wheel shaft 507 that is mounted at a distance from the frame portion 602. The brake element 504 can be mounted with a rear end of the shock absorber 501. As shown in FIG. 11, the brake element 504 can be pivotally connected with the shock absorber 501 at a pivot point 510, and can pivot relative to the shock absorber 501 between a braking position and a release position. The brake element 504 can be pushed downward to the braking position to engage with any of the recesses 508A of the hub 508, whereby rotation of the wheel 506 can be blocked. For allowing rotation of the wheels 506, the brake element 504 can be pulled upward until it reaches the release position disengaged from the recess 508A.

Figure 13:
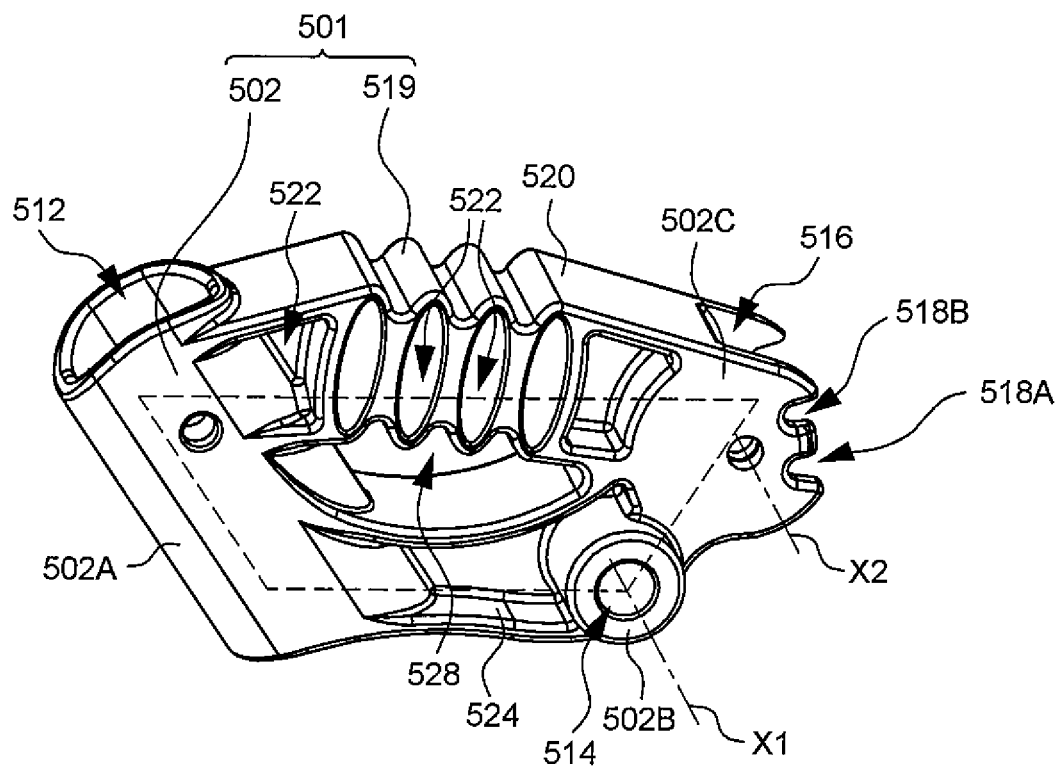
FIG. 13 is a schematic view illustrating the shock absorber provided in the wheel assembly shown in FIG. 11.

In conjunction with FIG. 12, FIG. 13 is a schematic view illustrating the shock absorber 501. The shock absorber 501 can be formed in a single body including a mount structure 502 and a cushion structure 519. The shock absorber 501 can be made of TPEE, such as the TPEE sold under the trademark Hytrel®. In one embodiment, the shock absorber 501 can have a shape that generally defines four sides. A first side of the shock absorber 501 can be defined by a first mount portion 502A having a tubular shape with an opening 512 into which the frame portion 602 can be inserted and fixedly fastened. After the frame portion 602 is inserted into the opening 512, a fastener element (not shown) may be engaged through the first mount portion 502A and the frame portion 602 to securely fasten the frame portion 602 with the first mount portion 502A.

A second side of the shock absorber 501 opposite to the first mount portion 502A can respectively include second and third mount portions 502B and 502C adjacently connected with each other. The third mount portion 502C is located above the second mount portion 502B. The first, second and third mount portions 502A, 502B and 502C can form the mount structure 502. The third mount portion 502C can be adjacent to the second mount portion 502B. The second mount portion 502B can be provided with a hole 514 through which the wheel shaft 507 can be passed along the rotation axis X1 to pivotally assemble the wheel 506.

The third mount portion 502C can include a slot 516 that is opened at the rear of the shock absorber 501. Two opposite sidewalls of the slot 516 can have a peripheral edge provided with a restrain structure configured to hold the brake element in the braking and release positions, such as locking grooves 518A and 518B shown in FIGS. 12 and 13. A portion of the brake element 504 can be assembled in the slot 516. A rivet or pin can be passed through the sidewalls of the slot 516 and the brake element 504 to pivotally connect the brake element 504 with the third mount portion 502C, thereby defining a pivot axis X2 of the brake element 504.

The cushion structure 519 of the shock absorber 501 is connected between the first and third mount portions 502A and 502C. More specifically, the cushion structure 519 can include a first arm 520 that is joined with upper ends of the first and third mount portions 502A and 502C. The first arm 520 can include a plurality of cavities 522 that are distributed along a direction of extension of the first connecting arm 520. The cavities 522 can be holes of any shapes, e.g., oval, lozenge, rectangle, circle, etc. In some embodiments, one or more of the cavities 522 can be disposed according to a honeycomb distribution. However, alternate embodiments may also dispose the cavities 522 according to any distributions. As shown in FIGS. 12 and 13, upper and lower surfaces of the first arm 520 can be formed as wave-shaped surfaces to facilitate its elastic deformation.

The second mount portion 502B can be joined with the first mount portion 502A via a second arm 524. A gap 528 may be defined between the second arm 524 and the first arm 520, and the first arm 520 can deform differently relative to the second arm 524.

The brake element 504 can be formed in a single body including an actuator portion 532 and a latching portion 534. A portion of the brake element 504 proximate to the third mount portion 502C can also include a protruding stud 536. The actuator portion 532 and the latching portion 534 are disposed in different radial directions relative to the pivot axis X2 of the brake element 534. When the actuator portion 532 is operated by a user, the latching portion 534 can be driven in rotation relative to the shock absorber 501. In one embodiment, the latching portion 534 can be formed as cylindrical projections extending outward from two opposite lateral sides of the shock absorber 501 that can engage with any of the recesses 508A of the hub 508 for braking.

When the brake element 504 in a braking state, the latching element 534 can engage with one of the recesses 508A of the hub 508. The stud 536 can engage with the locking groove 518A to keep the brake element 504 in the braking state.

To remove the braking state, the actuator portion 532 can be operated to turn the brake element 504 upward, whereby the stud 536 can disengage from the locking groove 518A and the latching portion 534 can disengage from the recess 508A. In addition, the stud 536 can engage with the other locking groove 518B to keep the brake element 504 in the release state.

Figure 14:
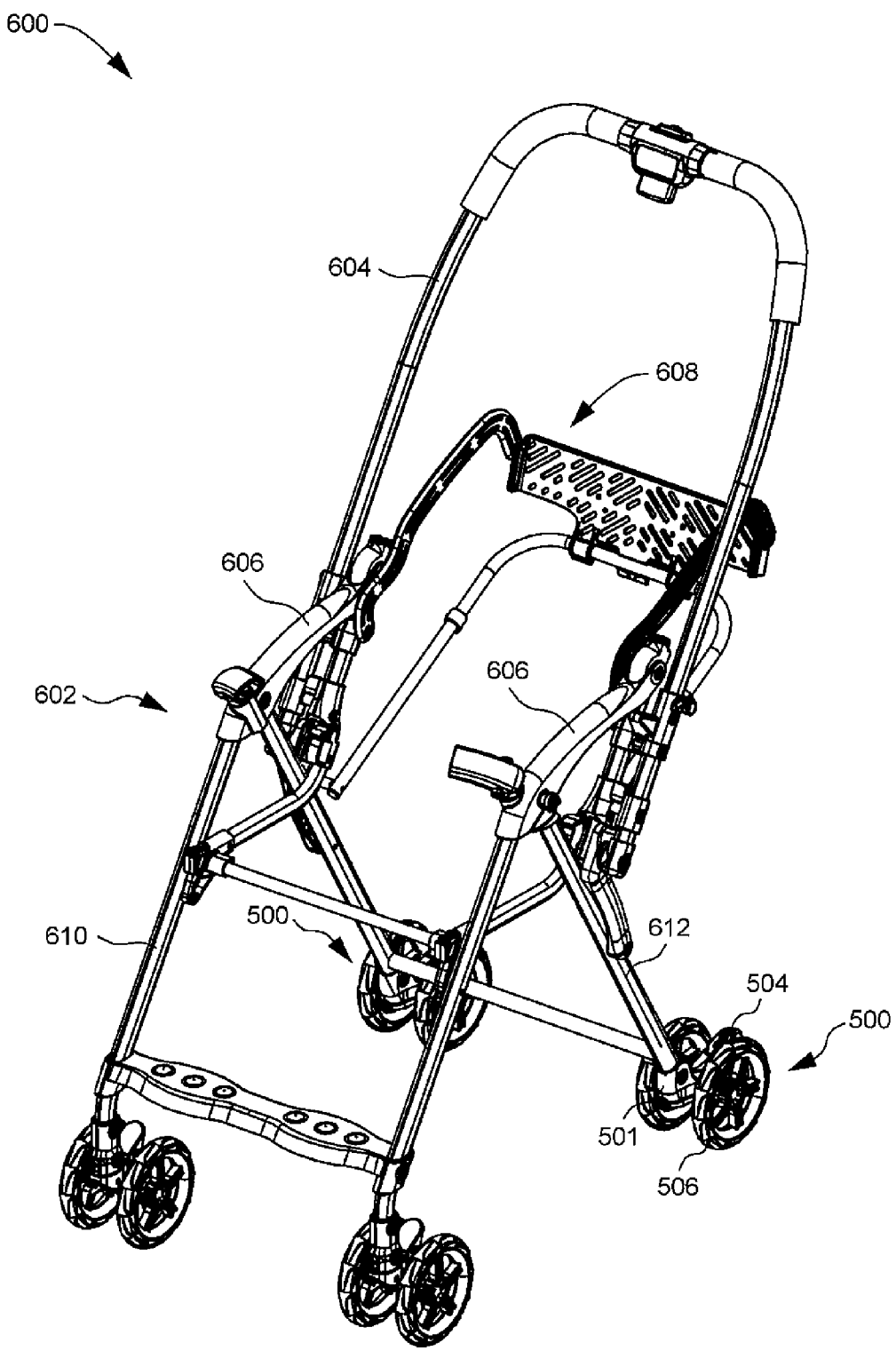
FIG. 14 is a perspective view illustrating a stroller embodiment of an infant carrier apparatus provided with the wheel assembly shown in FIG. 11.

FIG. 14 is a perspective view illustrating a stroller embodiment of an infant carrier apparatus 600 provided with the wheel assembly 500. The infant carrier apparatus 600 can include a support frame 602, a handle 604, armrests 606 and a backrest frame 608. The support frame 602 can include front legs 610 and rear legs 612 that have lower ends respectively mounted with wheel assemblies. According to one embodiment, the lower end of each rear leg 612 can be mounted with the wheel assembly 500 described previously. In other words, the lower end of the rear leg 612 can be inserted into the first mount portion 502A of the shock absorber 501.

In the wheel assembly 500, the brake element 504, the wheel 506 and the rear leg 612 can be directly assembled with the shock absorber 501. Accordingly, the amount of component parts can be reduced, and the manufacture can be simplified.

At least one advantage of the wheel assemblies described herein is the ability to provide a shock absorber designed with a mount structure that can at least directly couple with the wheel shaft. In some embodiments, the mount structure of the shock absorber can also be designed to mount other elements, such as a brake element for blocking rotation of the wheel. Accordingly, the amount of component parts can be reduced.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A wheel assembly for an infant carrier apparatus, comprising:
   a shock absorber;
   a mount base connected with the shock absorber; and
   at least a wheel pivotally coupled with the shock absorber;
   wherein the shock absorber is formed in a single body comprising a first arm, a second arm, and a link portion connected between the first and second arms, the first arm and the second arm having distal ends respectively connected with the mount base, and the link portion being connected with the wheel.

2. The wheel assembly according to claim 1, wherein the mount base includes a rotary element, and a joint element pivotally connected with the rotary element.

3. The wheel assembly according to claim 2, wherein the shock absorber is mounted with the rotary element, the shock absorber and the wheel being operable to rotate with the rotary element relative to the joint element.

4. The wheel assembly according to claim 3, wherein the rotary element is provided with a latch element, the latch element being operable to engage with a slot provided on the joint element to lock the rotary element, the shock absorber and the wheel in position relative to the joint element.

5. The wheel assembly according to claim 1, wherein the shock absorber is made of a thermoplastic polyester elastomer.

6. The wheel assembly according to claim 1, wherein a wheel shaft is passed through the wheel and the link portion to pivotally couple the wheel with the shock absorber.

7. The wheel assembly according to claim 1, wherein the second arm includes a plurality of cavities disposed along a direction of extension of the second arm.

8. The wheel assembly according to claim 7, wherein each of the cavities has a geometrical shape that is any of a circle, a rectangle, an oval, a lozenge, and a symmetrical shape having a long axis and a short axis.

9. The wheel assembly according to claim 7, wherein a material thickness between each of the cavities and an outer surface of the second arm is smaller than a material thickness between two adjacent cavities.

10. An infant stroller comprising:
a support frame; and
the wheel assembly according to claim 1 mounted with the support frame.

11. A wheel assembly for an infant carrier apparatus, comprising:
a shock absorber;
a mount base including a rotary element operable to rotate about a rotation axis, wherein the shock absorber is connected with the rotary element; and
at least a wheel pivotally coupled with the shock absorber;
wherein the shock absorber is formed in a single body comprising a first arm, a second arm, and a link portion connected between the first and second arms, the first arm and the second arm having distal ends respectively connected with the rotary element, and a wheel shaft is passed through the wheel and the link portion to couple the wheel with the shock absorber.

12. The wheel assembly according to claim 11, wherein the distal end of the first arm is connected with the rotary element at a location substantially adjacent to the rotation axis.

13. The wheel assembly according to claim 11, wherein the mount base further includes a joint element pivotally connected with the rotary element, and the rotary element is provided with a latch element, the latch element being operable to engage with a slot provided on the joint element to lock the rotary element, the shock absorber and the wheel in position relative to the joint element.

14. The wheel assembly according to claim 11, wherein the shock absorber is made of a thermoplastic polyester elastomer.

15. The wheel assembly according to claim 11, wherein the second arm includes a plurality of cavities disposed along a direction of extension of the second arm.

16. The wheel assembly according to claim 15, wherein each of the cavities has a geometrical shape that is any of a circle, a rectangle, an oval, a lozenge, and a symmetrical shape having a long axis and a short axis.

17. The wheel assembly according to claim 15, wherein a material thickness between each of the cavities and an outer surface of the second arm is smaller than a material thickness between two adjacent cavities.

18. An infant stroller comprising:
a support frame; and
the wheel assembly according to claim 11 mounted with the support frame.

* * * * *